United States Patent [19]

Braeger

[11] 4,340,995

[45] Jul. 27, 1982

[54] APPARATUS FOR SKINNING FISH

[75] Inventor: Horst Braeger, Lübeck, Fed. Rep. of Germany

[73] Assignee: Nordischer Maschinenbau Rud. Baader GmbH and Co Kg, Lübeck, Fed. Rep. of Germany

[21] Appl. No.: 250,306

[22] Filed: Apr. 2, 1981

[30] Foreign Application Priority Data

Jun. 2, 1980 [DE] Fed. Rep. of Germany ....... 3021151

[51] Int. Cl.³ .............................................. A22C 25/17
[52] U.S. Cl. .......................................... 17/62; 17/21; 99/589
[58] Field of Search .................. 17/21, 62, 50; 99/589

[56] References Cited

U.S. PATENT DOCUMENTS 3,094,739 6/1963 Eriksen ................................... 17/62
3,529,318 9/1970 Jobmann ................................ 17/62
4,222,152 9/1980 Braeger ................................... 17/62

FOREIGN PATENT DOCUMENTS 2747253 6/1978 Fed. Rep. of Germany .......... 17/62

Primary Examiner—Willie G. Abercrombie
Attorney, Agent, or Firm—Edward F. Levy

[57] ABSTRACT

An apparatus is disclosed for skinning fish having a skinning roller with which a fixed knife cooperates whose lower surface directed towards the skinning roller is constructed as a presser surface which together with the skinning roller defines a narrow gap. The peripheral surface of the skinning roller is provided with first grooves extending longitudinally which are interrupted by two arrays of second grooves situated approximately in the middle of the two halves of the skinning roller and extending around its periphery. The second grooves have a greater spacing than that of the first grooves.

12 Claims, 2 Drawing Figures

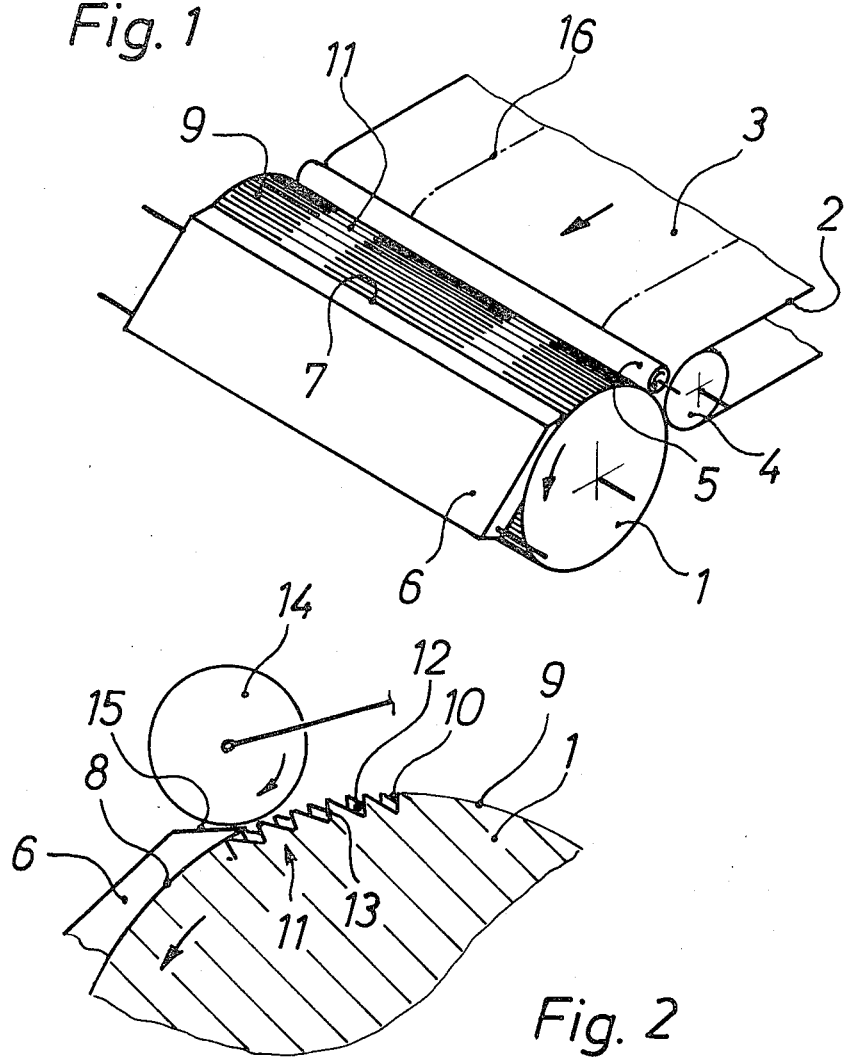

APPARATUS FOR SKINNING FISH

BACKGROUND OF THE INVENTION

1. Field of the Invention

The invention relates to an apparatus for skinning fillets of fish, in particular those of herring, comprising a skinning roller driven to rotate whose peripheral surface is provided with grooves extending in its longitudinal direction, a skinning knife whose cutting edge is arranged at a small distance from the peripheral surface of the skinning roller, a presser surface situated below the cutting edge and arranged opposed to the peripheral surface, and an endless feed belt driven to rotate.

2. Description of Prior Art

When skinning such fillets on skinning machines of this type there is a substantial problem of optimally coordinating the requirements that a reliable incision is achieved or ensured, that the extremely delicate skin of the fillet enters between the skinning roller and the presser surface, that a reliable transportation of the skin is achieved without its being damaged and that the so called silver mirror is retained on the skinned fillet. Such a coordination is particularly problematic because at least ensuring the incision and retaining the silver mirror require substantially opposing measures.

German Pat. No. 26 53 946 discloses a skinning machine of the above described type. By means of this machine, fillets, particularly those of fish with little fat, may be skinned satisfactorily, but it does not achieve a satisfactory result as regards quality and yield when processing herring fillets.

OBJECT OF THE INVENTION

It is thus an important object of the invention to provide a skinning apparatus which is especially suitable for skinning herring fillets and which satisfies the above requirements.

SUMMARY OF THE INVENTION

In machines of the afore described species, this object is solved in accordance with the present invention by providing the peripheral surface of the skinning roller with first grooves whose spacing is at most 1.7 mm (68 thousandths of an inch) the longitudinal extent of which is interrupted by at least one groove array extending around the periphery of the skinning roller of second grooves whose spacing is greater than that of the first grooves.

The advantages which may be achieved thereby reside primarily in the fact that on the one hand a reliable incision occurs in the region of the groove array provided with grooves of the larger spacing and even when skinning double fillets sufficient free space is present to receive the fins and fin rays and that on the other hand the silver mirror is retained in the flank regions of the fillets with gentle but reliable conveying.

For reasons of ease of manufacture the groove spacing or partition in the groove array of the second grooves may be twice as large as that of the remaining regions of the peripheral surface.

In order to achieve an improved conveying engagement with the skin the profile of the grooves in all regions can be saw-toothed with steep trailing flanks.

Arranging the groove array in the middle of the skinning roller or in the middle of the two halves of the skinning roller simplifies the positioning of the fillet to be processed on the conveying surface of the feed band.

In order to ensure the exactness of the entry of the fillet or the ends of the fillet into the array or arrays by correctly positioning the fillet means may be associated with the array or arrays of grooves to positionally align the fillet to be skinned into its starting position on the skinning roller. These means can advantageously comprise marking provided on the feed band extending in its direction of movement which run in the direction of movement into the arrays of second grooves. Thus when a fillet is laid on it by hand one can achieve an exact orientation for the correct skinning position of the fillet with relation to the groove arrays having the larger spacing. It is however also possible that these means may be constituted by the output end of a filleting machine which is correctly positionally aligned to these groove arrays. The fillets are fed from the filleting machine onto the feed belt and are conveyed by this in a straight line to the groove arrays.

In a preferred construction of the apparatus the presser surface is held tightly biased into engagement with the peripheral surface of the skinning roller and the latter is made of a low friction, high strength bearing material such as brass, bronze or the like. By this means a reliable conveying engagement of the extremely tender skin is ensured during the skinning.

In order to be able reliably to process salted fish whose end regions are notoriously dry and therefore stiff at least one driven and resiliently yieldable pressure roller can be arranged above the cutting edge of the skinning knife.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 1 is an axonometric view of the essential parts of a skinning apparatus in accordance with the invention from which the pressure rollers have been omitted and FIG. 2 is a cross sectional elevation in the region of a groove array looking towards the adjacent regions of the peripheral surface of the skinning roller and the pressure roller.

DESCRIPTION OF THE PREFERRED EMBODIMENT

The apparatus comprises a machine frame which is not shown and on which a skinning roller 1, a guide roller 4 for a feed belt 2 and a transition roller 5 are mounted, each of which is driven to rotate with a speed and direction appropriate to its respective function which is known per se. The feed belt 2 comprises a natural or synthetic material and has a gripping or engaging conveying surface 3 which is formed, e.g., of closely adjacently positioned burls or projections. The surface of the conveyor belt 2 is provided with elongate markings 16 which extend in its direction of movement.

A skinning knife 6 is associated with the skinning roller 1 and has a cutting edge 7 which is arranged parallel to the axis of the skinning roller 1 and in the immediate vicinity of a peripheral surface 9 of the latter. The inner surface of the cutting edge 7 is connected with a concave presser surface 8 whose radius of curvature corresponds to that of the peripheral surface 9. The presser surface 8 of the skinning knife 6 is held against the rotating peripheral surface 9 of the skinning roller 1 by a gentle spring force. The cutting edge 7 of the skinning knife 6 can be provided with an inner bevelled surface of some tenths of a millimeter (e.g. some thousandths of an inch). The peripheral surface 9 is provided with first grooves 10 extending along its length with a spacing of at most 1.7 mm (68 thousandths of an inch). The first grooves 10 are interrupted by two groove arrays 11 of second grooves 12 situated approximately in the middle of the two halves of the skinning roller 1. The groove arrays 11 extend around the periphery of the skinning roller 1. The second grooves 12 are spaced apart by a distance which is twice as large as the spacing of the first grooves 10. The grooves 10 and 12 have a sawtooth profile with steep flanks 13. The direction of rotation of the skinning roller 1 is such that the steep flanks 13 of the grooves 10 and 12 trail. Above the cutting edge 7 of the skinning knife 6 one or more driven pressure rollers 14 having a gripping or engaging surface are arranged which yield upwardly against the force of gravity or a spring and which in their rest position can be so supported that they face the back 15 of the skinning knife 6 and the peripheral surface 9 without contact. For reasons of clarity the position of a pressure roller 14 is only shown in FIG. 2.

The mode of operation of the apparatus is as follows:

A single or double herring fillet filleted by hand or coming from a filleting machine is laid with its skin downwards on the conveying surface 3 of the feed belt 2 so that the back portion of the fillet lies on, and longitudinal of, one of the markings 16 on the conveying surface 3. After passing the transition roller 5 the fillet reaches the skinning roller 1 and its back portion comes up against the peripheral surface 9 in the region of the groove arrays 11 lying substantially in line with the markings 16 in the conveying direction. Due to the sufficiently large second grooves 12 of these groove arrays the latter receive the end of the fillet and guide it without hindrance by the fin edge beneath the cutting edge 7 of the skinning knife 6. The skinning process is thus initiated and spreads into the regions of the peripheral surface 9 provided with the more closely spaced first grooves 10 and carrying the flank portions of the fillet so that the reflective layer situated under the skin in these portions of the fillet remains on the skinned fillet as the silver-mirror. Particularly when processing salted fillets this apparatus permits a more reliable incision or initial cutting-in to be effected if the end of the fillet, which is frequently dried out and thus stiff, is pressed into the second grooves 12 of the groove array 11 by means of a pressure roller 14 shortly before reaching the cutting edge 7 of the skinning knife 6.

What is claimed is:

1. Apparatus for skinning fish fillets, said apparatus including feed means, a skinning roller adapted to be rotated in a direction of rotation, said skinning roller having a longitudinal axis and a peripheral surface, a skinning knife having a cutting edge, said cutting edge being spaced by a small distance from said peripheral surface, and presser means situated below said cutting edge and adjacent said peripheral surface, said peripheral surface carrying an array of first grooves extending around said peripheral surface, said first grooves being spaced apart by a first distance, said first distance not exceeding 68 thousandths of an inch, said peripheral surface also carrying at least one array of second grooves extending around said peripheral surface and disposed adjacent said array of first grooves, said second grooves being spaced apart by a second distance, said first grooves and said second grooves extending substantially parallel to said longitudinal axis and said second distance being greater than said first distance.

2. Apparatus for skinning fish fillets, said apparatus including feed means, a skinning roller adapted to be rotated in a direction of rotation, said skinning roller having a longitudinal axis and a peripheral surface, a skinning knife having a cutting edge, said cutting edge being spaced by a small distance from said peripheral surface, and presser means being situated below said cutting edge and adjacent said peripheral surface, said peripheral surface carrying two spaced arrays of first grooves extending around said peripheral surface, said first grooves being spaced apart by a first distance not exceeding 68 thousandths of an inch, said two arrays of first grooves being separated by an array of second grooves extending around said peripheral surface, said second grooves being spaced apart by a second distance, said first grooves and said second grooves extending substantially parallel to said longitudinal axis and said second distance being greater than said first distance.

3. Apparatus as claimed in claim 2 wherein said skinning roller has a central plane transverse to said longitudinal axis, said array of second grooves being disposed substantially symmetrically on said skinning roller with respect to said central plane.

4. Apparatus for skinning fish fillets, said apparatus including feed means, a skinning roller adapted to be rotated in a direction of rotation, said skinning roller having a longitudinal axis and a peripheral surface, a skinning knife having a cutting edge, said cutting edge being spaced by a small distance from said peripheral surface, and presser means being situated below said cutting edge and adjacent said peripheral surface, said peripheral surface carrying three spaced arrays of first grooves extending around said peripheral surface, said first grooves being spaced apart by a first distance, said first distance not exceeding 68 thousandths of an inch, said three arrays of first grooves being spaced apart by two arrays of second grooves extending around said peripheral surface, said second grooves being spaced apart by a second distance, said first grooves and said second grooves extending substantially parallel to said longitudinal axis and said second distance being greater than said first distance.

5. Apparatus as claimed in claim 4 wherein said skinning roller has two ends and a central plane transverse to said longitudinal axis, said two arrays of second grooves being disposed on opposite sides of said central plane and each being disposed substantially midway between said central plane and one of said two ends.

6. Apparatus as claimed in claim 1, claim 2 or claim 4 wherein said second distance is substantially twice as large as said first distance.

7. Apparatus as claimed in claim 1, claim 2 or claim 4 wherein said first grooves and said second grooves are of substantially saw-toothed profile, said first grooves and said second grooves each having a leading flank and a trailing flank with respect to said direction of rotation, said trailing flanks being more steeply inclined that said leading flanks.

8. Apparatus as claimed in claim 1, claim 2 or claim 4 including alignment means associated with the or each array of second grooves and disposed to permit alignment of said fillets on said feed means with respect to said the or each array of second grooves.

9. Apparatus as claimed in claim 8 wherein said feed means has an upper surface, said alignment means comprising elongate markings on said upper surface extending towards a predetermined point on said the or each array of second grooves.

10. Apparatus as claimed in claim 1, claim 2 or claim 4 wherein said presser means is formed by a presser surface held biased against said peripheral surface.

11. Apparatus as claimed in claim 1, claim 2 or claim 4 wherein said skinning roller is made of a low-abrasion high strength bearing material.

12. Apparatus as claimed in claim 1, claim 2 or claim 4 including at least one resiliently yieldable pressure roller situated above said cutting edge of said skinning knife.

* * * * *